United States Patent [19]

Angle

[11] 4,382,267

[45] May 3, 1983

[54] DIGITAL CONTROL OF NUMBER OF EFFECTIVE ROWS OF TWO-DIMENSIONAL CHARGE-TRANSFER IMAGER ARRAY

[75] Inventor: Rodney L. Angle, Millstone, N.J.

[73] Assignee: RCA Corporation, New York, N.Y.

[21] Appl. No.: 305,172

[22] Filed: Sep. 24, 1981

[51] Int. Cl.³ .......................... H04N 3/15; H01L 31/00
[52] U.S. Cl. ................................. 358/213; 357/24 LR
[58] Field of Search ............... 358/212, 213, 211, 109, 358/113, 293, 294; 357/24 LR; 340/146.3 F; 250/578, 572, 567

[56] References Cited

U.S. PATENT DOCUMENTS 3,833,762  9/1974  Gudmundsen ...................... 250/578
4,280,141  7/1981  McCann et al. ..................... 358/213

OTHER PUBLICATIONS

Sadowski et al., "Large Time Delay and Integration, (TDI) Focal Plane Assembly with an Optically Contiguous Pixel Format", *SPIE,* vol. 217, Advances in Focal Plane Technology (1980), pp. 111-117.

*Primary Examiner*—John C. Martin
*Attorney, Agent, or Firm*—Joseph S. Tripoli; George J. Seligsohn

[57] ABSTRACT

Digital control means responsive to an applied digital signal controls which row or rows of an N row-Q column CCD imager are effective in transferring charge and which are not. Such digital control is suitable for use in providing variable gain for a time-delay integration (TDI) charge-transfer imager in accordance with the average brightness level of the light incident on the imager.

9 Claims, 7 Drawing Figures

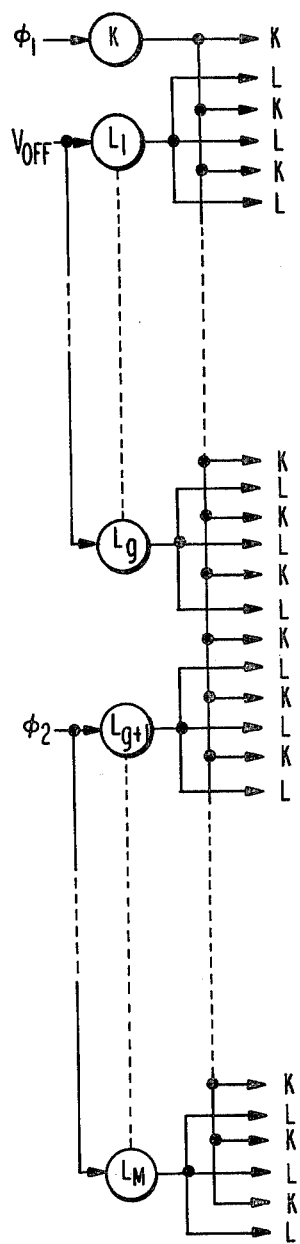
PRIOR ART
*Fig.3*
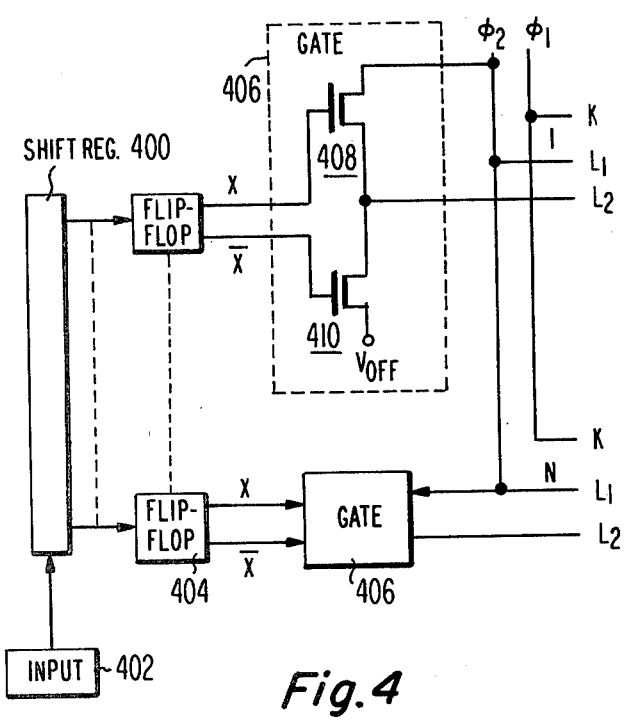
*Fig.4*
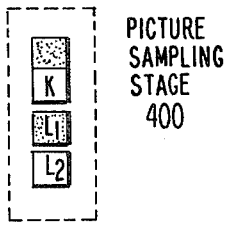
*Fig.4a*
| SHIFT REG. STAGES | | | | | | |
|---|---|---|---|---|---|---|
| 1 | 2 | --- | j | j+1 | --- | N |
| 0 | 0 | --- | 0 | 1 | --- | 1 |
*Fig.4b*

DIGITAL CONTROL OF NUMBER OF EFFECTIVE ROWS OF TWO-DIMENSIONAL CHARGE-TRANSFER IMAGER ARRAY

The Government has rights in this invention pursuant to Contract No. U.S.P.S. 104230-79-Z-1613 with the United States Postal Service.

This invention relates primarily to a system incorporating a time-delay integration (TDI) charge-transfer imager, such as a charge-coupled device (CCD) imager, and more particularly, to an improved electronic exposure control for such a TDI imager system.

TDI imagers are known in the art and are described, by way of example, in U.S. Pat. No. 3,833,762, issued Sept. 3, 1974, to Gudmundsen. A TDI imager has application in areas where a low light level exists and/or where image movement is so fast that not enough photoelectric charge can be accumulated in each individual picture-sampling stage of the imager. The function of a TDI imager array is basically that of a one-dimensional line array, but structurally is in the form of a two-dimensional array that includes an individual one of a plurality of multiple-sampling-stage channels corresponding to each imager element sample of a viewed image line. The channels are oriented perpendicular to the image line. The image line is moved at a given speed in a given direction parallel to that of the channels and the charge photoelectrically produced by each image element sample in a sampling stage of the channel corresponding to that element is transferred along that channel at the same given speed, in the same direction, in synchronization with the motion of the image line. In each successive sampling stage of a channel additional photoelectrically produced charge is generated by the same image element of the line and added to the accumulated transferred charge in that channel until the accumulated charge packet leaves that imager channel. If each channel $Q_i$ is comprised of N sampling stages (where N is a plural integer), and the photoelectrically produced charge in each sampling stage of channel $Q_i$ is $q_i$, then the amount of charge in the charge packet leaving channel $Q_i$ of the imager is equal to $Nq_i$. Therefore, a TDI imager results in an effective gain in sensitivity which is proportional to N, assuming that proper operating conditions prevail.

As is known in the CCD art, each sampling stage includes a potential well of a given depth. Any attempt to overfill a potential well with charge causes blooming to occur. Therefore, the maximum amount of charge in the charge packet $Nq_i$ should always be less than a full well to prevent blooming. On the other hand, N must be large enough to allow adequate detection of the image under the lowest light level condition that can be expected. If image brightness were to remain constant at all times, there would be no problem. However, often, in practice, this is not the case. Image brightness may be proportional to the intensity of a light source, which intensity decreases with the age of the light source. The lighting, affecting image brightness, may be different during the day than it is at night. Image brightness may depend on the difference in overall reflectivity or overall transmissivity of various different objects which may be successively imaged. Regardless of the specific cause, in any case in which a substantial change in image brightness is to be expected, it becomes desirable to control the gain of TDI imager so that no blooming occurs under high image brightness conditions and, at the same time, so that there is a maximum gain capability sufficient to provide adequate detection of the image for the lowest brightness conditions that can be expected.

The present invention may be utilized to provide improved electronic exposure control means for a TDI imager system, which exposure control means may be integrated on the same chip as the imager itself. This exposure control means permits the number of effecitve sampling stages of a TDI imager having N sampling stages per channel to have any value between one and N in accordance with an externally applied digital control signal.

More specifically, the present invention is concerned with an imager system that incorporates a charge-transfer imager comprised of a two-dimensional array of picture-sampling stages arranged in N rows and Q columns, where N and Q are plural integers. In accordance with the principles of the present invention, digital control means, which is coupled to the imager and is responsive to the value of an applied digital signal, selectively disables charge-transfer by at least the picture sampling stages of the j'th row, where j is an integer between one and N whose value is determined by the value of the applied digital signal.

In the drawings:

FIG. 3 illustrates a prior art control means for operating the imager of FIG. 2 as an adjustable time-delay integration CCD imager;

FIG. 4 illustrates control means, making use of the present invention, for operating a CCD imager having the modified structure of FIG. 4a to permit its use as an adjustable time-delay integration CCD imager;

FIG. 4a illustrates a modification of the structure of each of the picture-sampling stages, of the imager shown in FIG. 2, in accordance with the principles of the present invention;

FIG. 4b illustrates a typical truth table for the stages of the shift register shown in FIG. 4, and FIG. 5 illustrates a preferred embodiment of the chip architecture for realizing the structure shown in FIGS. 4 and 4a.

Figure 1:
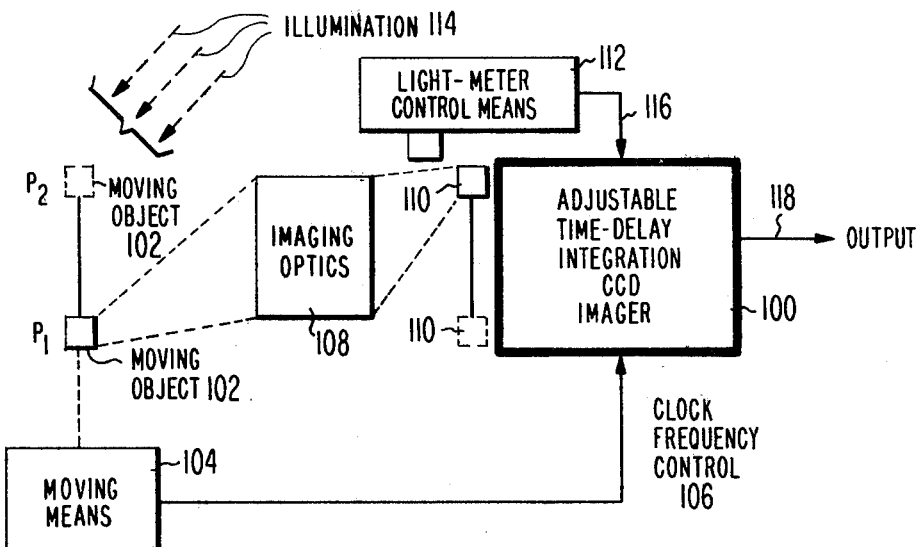
FIG. 1 illustrates a typical system which may employ an adjustable time delay integrating CCD imager using the present invention.

Referring to FIG. 1, there is shown an illustrative system utilizing an adjustable time-delay integration CCD imager 100 that incorporates that present invention. The system also comprises an illuminated moving object 102, which is moved from position $P_1$ to position $P_2$ at a given speed by moving means 104. Moving means 104 derives a clock frequency control signal on lead 106 for controlling the rate of charge-transfer in imager 100 in correspondence with given speed of moving objection 102. (In another type of TDI system, the moving object may be a vehicle or other object whose speed is not under the control of the TDI system itself. In this case, it would be necessary to manually or automatically track the moving object in order to synchronize the clock frequency with the speed of the moving object). Imaging optics 108 images moving object 102 into moving image 110, which moving image 110 is sensed by CCD imager 100. Light-meter control means 112, which monitors the brightness of the light forming image 110, derives, as an output therefrom, an additional control signal 116 for adjusting the limits of integration (and, hence, the effective gain) of time-delay integration CCD imager 100. The output on lead 118 from imager 100 is a video signal of the imaged moving object 102.

By way of example, the system shown in FIG. 1 may be useful in the high-speed, automatic sorting of mail. In this example, moving object 102 might be each separate one of a series of letters successively moved at very high-speed past imaging optics 108. The information in video signal 118 would contain letter address information, such as the ZIP code for example. In this example, video signal on lead 118 would be forwarded as control information to computer-controlled, automatic, high-speed sorting apparatus (not shown).

High-speed movement of objects, such as letters in this example, necessitates a certain amount of time-delay integration by CCD imager 100. However, just how big this certain amount of integration should be, without risking blooming by CCD imager 100, depends upon the brightness of image 110. The brightness of image 110, which depends both on the intensity of illumination 114 and the average reflectance of letter envelopes, varies over a large dynamic range. Additional control signal 116, coupled from light-meter control means 112 (which continuously monitors the brightness of image 110) to imager 100, by varying the limits of integration of TDI imager 100, maintains video signal output 118 near its optimum level despite large changes in the brightness of image 110.

Figure 2:
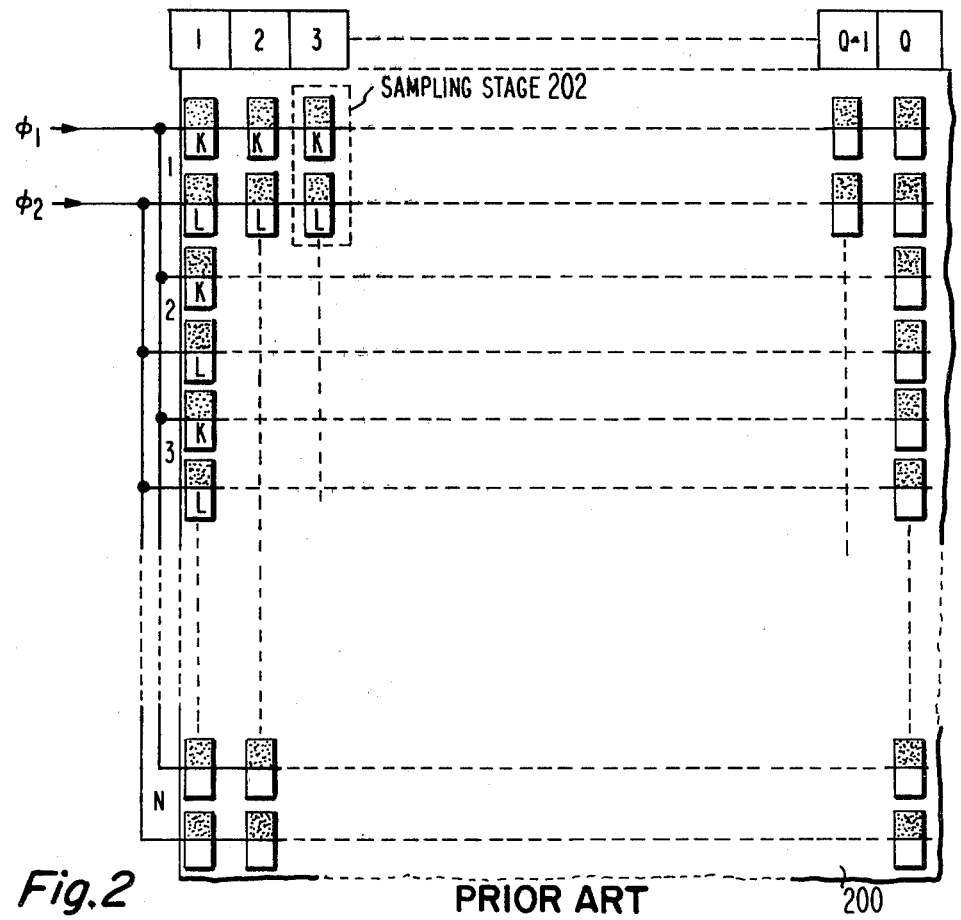
FIG. 2 is a schematic illustration of a typical prior art two-dimensional CCD imager.

Referring to FIG. 2, there is shown in schematic form a typical example of a prior art two-phase clock voltage, two-dimensional CCD imager. Such an imager comprises all or a portion of a substrate surface 200 of a semiconductor chip on which is spatially distributed a plurality of picture-sampling stages 202 arranged in N rows and Q columns (where, N and Q are plural integers). Each of the Q columns comprises an individual channel that is isolated from adjacent channels by a potential barrier (not shown in FIG. 2). The potential barrier, which runs in the column direction the entire length of the chip from row 1 to row N, may take the form of a channel stop. Each sampling stage 202 includes a K electrode overlying an asymmetrically doped area of substrate 200 and an L electrode also overlying an asymmetrically doped area on substrate 200. The respective asymmetrically doped areas underlying the K and the L electrodes of each sampling stage 202 form relatively shallow charge-transfer potential well regions (shown stippled in FIG. 2) and relatively deep charge-storage potential well regions (shown non-stippled in FIG. 2). Clock-voltage having a phase $\phi_1$ is applied to the K electrodes of all the sampling stages 202 of the array and clock-voltage having a phase $\phi_2$ is applied to the L electrodes of all the sampling stages 202 of the array. In operation, charge is transferred from sampling stage of one row to sampling stage of the next row along a channel in a direction from row 1 towards row N. The prior art imager shown in FIG. 2 may be operated as a TDI imager. However, with the clock-voltages connected to the K and L electrodes in the manner shown in FIG. 2, the array shown in FIG. 2 provides a fixed gain determined by the particular value of N of that array Thus, the arrangement shown in FIG. 2 is not capable of adjusting the number of rows that are effective in providing TDI operation.

FIG. 3 shows a prior art technique for providing an adjustable capability for the array shown in FIG. 2. Specifically, the phase $\phi_1$ clock-voltage is applied through a single pad K to the electrodes of all the sampling stages 202, in a manner substantially identical with the way the phase $\phi_1$ clock-voltage is applied in FIG. 2. However, the L electrodes of the N individual rows are organized into a plurality of groups, each group comprising a given plurality of contiguous rows. Thus, for example, if the total number of rows N is 64, the 64 rows may be organized into 16 groups of 4 contiguous rows each. In general, the N rows are divided into M groups. Each of the groups has its own pad $L_1 \ldots L_M$ associated therewith. All the L electrodes of all the contiguous rows associated with the $L_1$ pad are electrically connected to the $L_1$ pad. The same thing holds true for the L electrodes associated with each of the other M pads, as indicated in FIG. 3. The first g pads $L_1 \ldots L_g$ (where g has any value between 1 and M) have voltage $V_{OFF}$ applied to them and the remainder of the pads $L_{g+1} \ldots L_M$ have phase $\phi_2$ clock-voltage applied to them. In this example, each group is comprised of the L electrodes of 4 contiguous rows of the imager array shown in FIG. 2. Further, as shown in FIG. 3, the first 4 g rows of the N row array shown in FIG. 2 are ineffective in transferring charge. Therefore, only the remaining rows associated with the phase $\phi_2$ clock-voltage of the N row array of FIG. 2 are effective in time-delay integration of the image. Thus, the arrangement of FIG. 3 permits adjustment of the integration limits, in four-row resolution intervals, in accordance with the selected value of g. In FIG. 3, altering the selected value of g is relatively slow and cumbersome, since, in effect, it involves selective connection of some of the L pads to $V_{OFF}$ and the remainder of the L pads to phase $\phi_2$. Thus, utilizing the arrangement of FIG. 3, it would not be possible to continually adjust the limits of integration in accordance with the then current brightness of image 110, as discussed above in connection with FIG. 1.

In accordance with the principles of the present invention, the respective picture-sampling stages of the imager array shown in FIG. 2 are modified in structure in the manner shown in FIG. 4a. Specifically, as shown in FIG. 4a, each picture-sampling stage 400 includes a K electrode that is substantially identical to that shown in FIG. 2. However, each picture-sampling stage 400 of the modified imager array of the present invention employs separate $L_1$ and $L_2$ electrodes, rather than employing only a single L electrode as does each picture-sampling stage of the array shown in FIG. 2. In FIG. 4a, the $L_1$ electrode of each picture-sampling stage 400 overlies only a (stippled) charge-transfer potential well region and the $L_2$ electrode of each picture-sampling stage 400 overlies only a (non-stippled) charge-storage potential well region. In all other respects, the structure of the modified imager array of the present invention is substantially identical to that of the unmodified imager array shown in FIG. 2.

Referring to FIG. 4, there is shown a schematic circuit diagram for selectively applying control voltages to the respective K, $L_1$ and $L_2$ electrodes of the picture-sampling stages 400 of each of the separate rows 1 ... N of the modified imager array structure shown in FIG. 4a. As shown in FIG. 4, shift register 400, which comprises N stages, is serially loaded by input 402 which supplies bits of an N-bit digital code. Preferably, the digital code should conform with the truth table shown in FIG. 4b. As shown in FIG. 4b, each of stages 1 ... j (where j is an integer between 1 and N) of shift register 400 is loaded with a binary ZERO, while each of stage j+1 ... N of shift register 400 are loaded with a binary ONE. Individually associated with the output of each of stages 1 . . . N of shift register 400 is a flip-flop 404. Each flip-flop 404 assumes a state that derives a binary ONE at its X output in response to the stage of shift register 400 with which it is individually associated being loaded with a binary ONE. Each flip-flop 404 assumes a state that derives a binary ONE at its $\overline{X}$ output in response to the stage of shift register 400 with which it is individually associated being a binary ZERO. Individually associated with both the X and the $\overline{X}$ outputs of each of flip-flops 404 is a gate 406. As indicated in FIG. 4, each of gates 406 may comprise a first FET transistor 408 and a second FET transistor 410, both have the same conductivity channel. Transistor 408 operates as a closed switch only in response to the X output of the flip-flop 404 with which that gate 406 is associated manifesting a binary ONE. Transistor 410 operates as a closed switch only in response to the $\overline{X}$ output of the flip-flop 404 with which that gate 406 is associated manifesting a binary ONE.

From the foregoing discussion, it is plain that there are N flip-flops 404 and N gates 406, with each of the N stages of shift register 400 and the individual flip-flop 404 and gate 406 associated therewith corresponding to a different one of the N rows. As indicated in FIG. 4, phase $\phi_2$ clock-voltage is forwarded to the $L_2$ electrode of a particular one of the N different imager rows only when transistor 408 of the gate 406 corresponding to that particular row is turned on (conducts) and the transistor 410 is off, and $V_{OFF}$ is forwarded to the $L_2$ electrode of a particular one of the N different imager rows only when the transistor 410 of the gate 406 corresponding to that particular row is turned on and the transistor 408 of that gate is off. Thus, whether phase $\phi_2$ clock-voltage or $V_{OFF}$ is forwarded as a control voltage to the $L_2$ electrode of a particular one of N different imager rows is determined solely by the binary value setting of the particular stage of shift register 400 corresponding to that particular row. If the stage of that particular row is set to a binary ONE, phase $\phi_2$ clock-voltage will be forwarded to $L_2$ electrodes of that particular one of the N different imager rows. Alternatively, if that stage of shift register 400 is set to a binary ZERO, $V_{OFF}$ will be forwarded to the $L_2$ electrodes of the particular one of the N different imager rows. $V_{OFF}$ is a D.C. voltage having a relatively low level that forms a potential barrier, rather than a potential well.

As further shown in FIG. 4, phase $\phi_1$ clock-voltage is directly applied to K electrodes and the phase $\phi_2$ clock-voltage is directly applied to the $L_1$ electrodes of all of the N rows of the imager.

Assuming that the truth table shown in FIG. 4b applies to the digital code stored in the N stages of shift register 400 and that the imager is being operated as a time-delay integration imager, it is clear that first j rows of the imager are ineffective. In brief, during integration, charges do collect in the storage regions (stippled) beneath the K electrodes of these first j rows, assuming that $\phi_1$, the voltage applied to the K electrodes is at a high level to produce storage potential wells at these sites and that $\phi_2$, the voltage applied to the $L_1$ electrodes is at a lower level so that the $L_1$ electrodes produce potential wells which are shallower than both the storage and the transfer potential wells beneath the K electrodes. When, during a following time period, $\phi_1$ goes low and $\phi_2$ goes high, the charges shift through the transfer regions of K electrodes to the newly created storage regions beneath the $L_1$ electrodes of the first j rows. However, when, during the following time period $\phi_1$ goes high again and $\phi_2$ goes low, no charge-transfer can take place in the first j rows. The reason is that $V_{OFF}$ is applied to the $L_2$ electrodes creating a potential barrier beneath these electrodes and preventing the propagation of charge to beneath the K electrodes of the following row. Thus, maintaining the $L_2$ electrodes of the first j rows at $V_{OFF}$ means, in effect, that the first j rows are effectively disconnected from the array and do not contribute to the translation of picture information into useful charge. Therefore, only rows j+1 . . . N contribute to the integration, and, hence, the gain of the TDI imager. Thus, the gain of the TDI imager is determined solely by the selected value of j, which, in turn, depends upon the particular digital code applied to shift register 400 from input 402.

In the system shown in FIG. 1, light-meter control means 112 may include an analog-to-digital converter that derives a digital code in accordance with the truth table of FIG. 4b. In this case, the value of j depends upon the monitored brightness of the light forming image 110. This results in the selected value of j stored in shift register 400 being changed on a current basis with changes in the monitored brightness level of the light forming image 110. This adjusts the integration limits of TDI imager 100 accordingly to maintain the level of video signal output 118 near its optimum, despite large changes in the brightness level of the light forming image 110. Furthermore, since the arrangement shown in FIG. 4 permits j to have any value between 1 and N, the resolution with which the effective gain of a TDI imager having N rows may be adjusted is high, particularly as compared to the prior art arrangement shown in FIG. 3.

Although the arrangement shown in FIG. 4 is considered to be a preferred embodiment of the present invention, it should be understood that alternative structure may be employed to achieve the same overall function. For instance, the N stage shift register 400 may be replaced by an N stage register which is loaded in parallel by an N-bit digital code. Furthermore, the digital code is not limited to one having the truth table shown in FIG. 4b. A digital code in which only the J'th bit is a binary ZERO still results in all of rows 1 . . . j of the TDI imager being ineffective in integrating the image. The reason is that while charge integration and propagation will take place in the first (j−1) rows, the potential barrier created by the voltage $V_{OFF}$ applied to the $L_2$ electrode of the j'th row will prevent the propagation of charge beyond the j'th row.

The present invention may be used in other application a TDI imager. For instance, by employing an appropriate digital code, an N row imager array may be divided into a plurality of separate imager areas each having fewer than N rows, in which the respective separate areas may form independent imagers, all of which imagers may be operated in parallel to provide simultaneously a plurality of separate video signal outputs.

An additional benefit of the circuit of FIG. 4 is that it can be efficiently realized in integrated circuit form on the same chip as the CCD imager. The integrated circuit form of shift registers and flip-flops are well known in the art and need not be shown in detail. A preferable form of the architecture for gates 406 the K, $L_1$ and $L_2$ electrodes of the imager, and the coupling between them and the respective sources of control voltage, is shown in FIG. 5.

Figure 5:
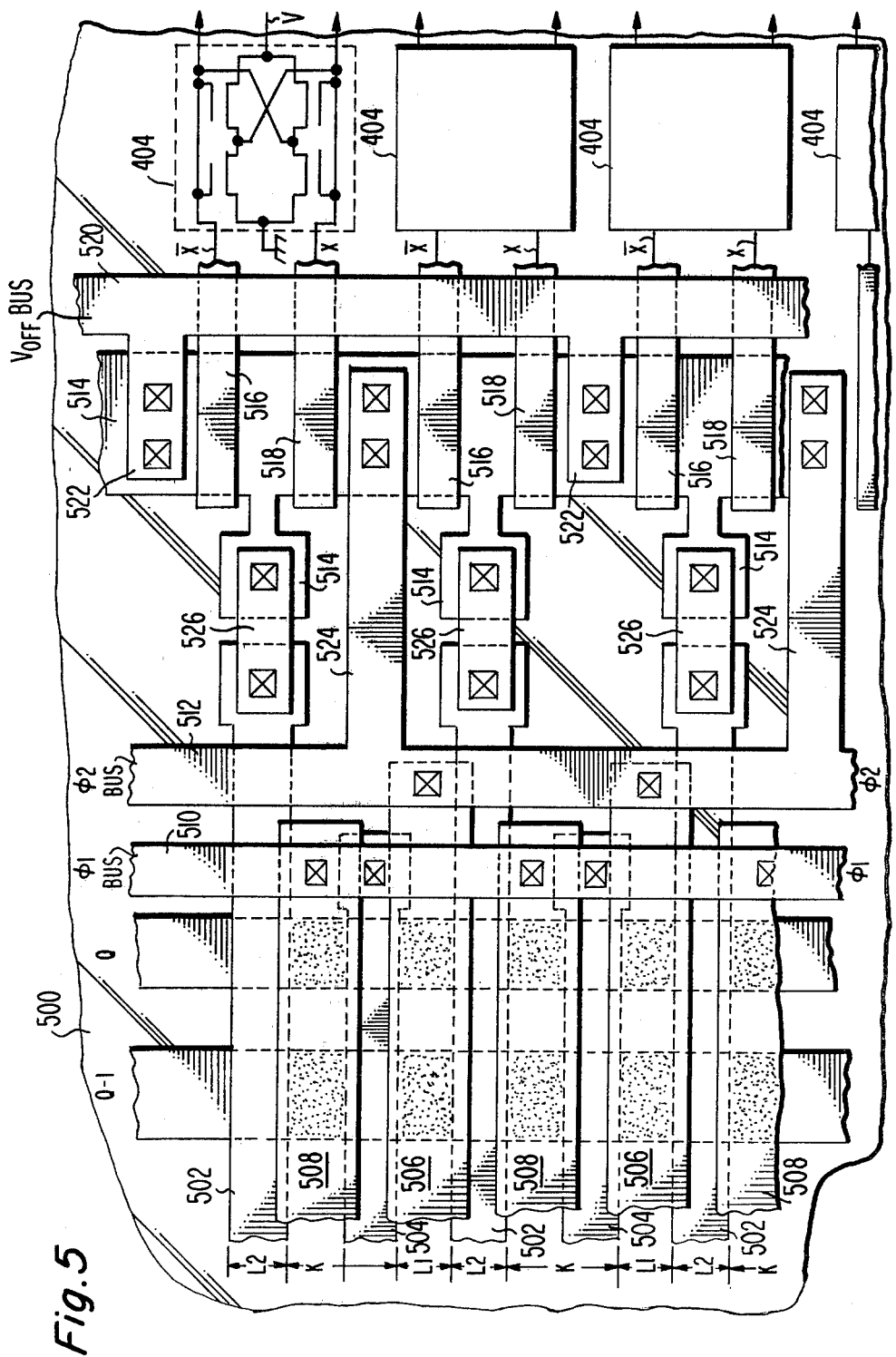

Referring to FIG. 5, a semiconductor chip substrate surface 500 includes imager channels 1 . . . Q (only channels Q−1 and Q being shown in FIG. 5) running in the column direction. The imager channels are asymmetrically doped to provide (stippled) charge-transfer potential well regions and (non-stippled) charge-storage potential well regions. A first-level polysilicon layer extending in the row direction orthogonal to the Q−1 and Q channels overlies the non-stippled charge-storage regions of the imager channel to form $L_2$ electrodes 502 and to form respective portions 504 of the K electrodes. A similar second-level polysilicon layer overlying the stippled charge-transfer regions of the imager form $L_1$ electrodes 506 and respective second portions 508 of the K electrodes. Running in the column direction and overlying the polysilicon electrodes, are metallic $\phi_1$ phase bus 510 and $\phi_2$ phase bus 512. The chip substrate surface 500 also includes an FET channel area 514, the boundaries of which may be defined by a thick field oxide layer on substrate 500.

Connected to the $\overline{X}$ output of each flip-flop 404 (which flip-flops are integrated circuits on chip surface 500 that are shown schematically in FIG. 5) is first polysilicon level FET gate electrodes situated, as shown, in cooperative spatial relationship with FET channel 514. Similar FET gate electrodes 518 are connected to the X output of each flip-flop 404. The metallic $V_{OFF}$ bus 520 includes respective stub portions 522 which are directly electrically connected to respective regions of FET channel 514 situated immediately above FET gates 516. The metallic bus 512 includes respective stubs 524 which are directly electrically connected to respective regions of FET channel 514 situated immediately below gates 518. The regions of FET channel 514 situated between each electrode 516 and 518 associated with each flip-flop 404 is electrically connected to a corresponding gate electrode $L_2$ by a respective one of metallic layer couplers 526.

The transistor 410 of each gate 406 shown in FIG. 4 is physically realized in FIG. 5 by each portion of FET channel 514 that intercouples a stub 522 with its adjacent coupler 526, together with the FET gate 516 situated therebetween. Similarly, the transistor 408 of each gate 406 in FIG. 4 is physically realized in FIG. 5 by each portion of FET channel 514 that intercouples a stub 524 with its adjacent coupler 526, together with the FET gate 518 situated therebetween.

What is claimed is:

1. In combination:
a charge-transfer imager comprised of a two-dimensional array of picture-sampling stages arranged in N rows and Q columns, where N and Q are plural integers, and
digital-control means coupled to said imager, said digital-control means being responsive to the value of an applied digital signal for selectively disabling charge-transfer by at least the picture sampling stages of the j'th row of said imager, where j may have any value, selected in accordance with said applied digital signal, between one and N.

2. The combination defined in claim 1, wherein said imager comprises a first integrated circuit situated on semiconductor chip, and wherein said digital-control means comprises a second integrated circuit situated on the same semiconductor chip as said first integrated circuit.

3. The combination as defined in claim 1, wherein said imager is a CCD imager which is effective in transferring charge along each column from picture-sampling stages of one row to corresponding picture-sampling stages of the next row in a direction toward row N in response to all phases of a set of P phase clock-voltages being applied to said imager, where P is a given plural integer,
wherein said applied digital signal comprises an N-bit binary number, and
wherein said digital control means comprises an N-stage shift register which is serially loaded with said applied digital signal to thereby store the corresponding one of said N-bits, in each of said respective N-stages of said shift register, a set of N flip-flops individually associated with and having their respective inputs coupled to corresponding ones of said N-stages of said shift register to thereby set the binary state of respective ones of said set of N flip-flops in accordance with the respective values of the respective bits stored in the corresponding ones of the N stages of said shift register, and voltage coupling means including a set of N two-position switches individually associated with and having their switch positions controlled by the respective binary states of corresponding ones of said set of N flip-flops for applying all of said P clock-voltages to said j'th row of said imager only when that one of said set of N switches corresponding to said j'th row is in a first of its two-positions.

4. The combination defined in claim 3, wherein said voltage-coupling means applies a D.C. voltage of a given level to said j'th row when that one of said set of N switches corresponding to said j'th row is in a second of its two-positions, said given level being sufficient to disable transfer of charge along each column from picture-sampling stages of said j'th row to corresponding picture-sampling stages of the row next to said j'th row in a direction toward N.

5. The combination defined in claim 1, wherein said imager is a P phase CCD imager in which each picture-sampling stage is composed of 2P contiguous regions, where P is a plural integer, extending in said column direction, alternate ones of said 2P contiguous regions of each picture-sampling stage being composed of charge-transfer regions and the remaining ones of said 2P contiguous regions being composed of charge-storage regions, and a set of gate electrodes extending in said row direction and associated with said respective regions of said picture-sampling stages of said array for transferring charge in said column direction from the picture-sampling stages of any given row of said set to the next succeeding row only in response to respective ones of clock-voltages of P phases being applied to the gate electrodes associated with all the regions of the picture-sampling stages of said given row, and
wherein said control means comprises clock-voltage means including said digitally-controlled means for selectively applying said respective ones of clock-voltages of P phases to the gate electrodes associated with all the regions of the picture-sampling stages that given row in accordance with one or more certain values of said digital signal or, alternatively, applying a given D.C. voltage to at least the particular gate electrode associated with a particular one of the regions of the picture-sampling stages of that given row in accordance with one or more other values of said digital signal from said certain values said given D.C. voltage being applied to said particular gate electrode preventing transfer of charge to said next succeeding row.

6. In a time-delay integration (TDI) charge-transfer imager system incorporating a TDI imager comprised of a two-dimensional array of picture-sampling stages arranged in N rows and Q columns, where N and Q are plural integers, wherein said TDI imager is adapted to be exposed to linear light image extending in said row direction which image is moving at a given rate in said column direction from the first to the N'th rows, and wherein said imager system includes control means associated with each row and operated in synchronism with said moving image for transferring charges at substantially said given rate in said column direction from the picture-sampling stages of each row to the picture sampling stages of the next following row; the improvement:

wherein said control means includes digitally-controlled means responsive to the value of an applied digital signal for selectively disabling at least the picture-sampling stages of the j'th row, out of the set of rows consisting of the first row to the j'th row, where j may have any value selected in accordance with said applied digital signal, between one and N.

7. The system defined in claim 6,
wherein said imager is a P phase CCD imager in which each picture-sampling stage is composed of 2P contiguous regions, where P is a plural integer, extending in said column direction, alternate ones of said 2P contiguous regions of each picture-sampling stage being composed of charge-transfer regions and the remaining ones of said 2P contiguous regions being composed of charge-storage regions, and a set of gate electrodes extending in said row direction and associated with said respective regions of said picture-sampling stages of said array for transferring charge in said column direction from the picture-sampling stages of any given row of said set to the next succeeding row only in response to respective ones of clock-voltages of P phases being applied to the gate electrodes associated with all the regions of the picture-sampling stages of said given row, and wherein said control means comprises clock-voltage means including said digitally-controlled means for selectively applying said respective ones of clock-voltages of P phases to the gate electrodes associated with all the regions of the picture-sampling stages that given row in accordance with one or more certain values of said digital signal or, alternatively, applying a given D.C. voltage to at least the particular gate electrode associated with a particular one of the regions of the picture-sampling stages of that given row in accordance with one or more other values of said digital signal from said certain values said given D.C. voltage being applied to said particular gate electrode preventing transfer of charge to said next succeeding row.

8. The system defined in claim 6,
further including light-meter control means for monitoring the current average brightness level of the light imaged on said imager, said light-meter control means incorporating an analog-to-digital converter for deriving as an output therefrom a digital signal having a value indicative of said monitored average brightness level, said digital signal output from said light-meter control means being applied as an input to said digital control means for selecting the value of j in accordance with the value of said applied digital signal.

9. The system defined in claim 8,
wherein said monitored average brightness level can be expected to vary within a range extending from a first given relatively low brightness level and a second given high brightness level,
wherein the value N is sufficiently large to provide an adequate output signal from said TDI imager having at least a given magnitude at said first relatively low brightness level, and
said digital signal selecting those respective values of j in accordance with said monitored current average brightness level that prevent blooming by said TDI imager under all average brightness levels within said range.

* * * * *